United States Patent [19]

McIver et al.

[11] Patent Number: 5,031,180

[45] Date of Patent: Jul. 9, 1991

[54] TRIPLE REDUNDANT FAULT-TOLERANT REGISTER

[75] Inventors: George W. McIver, Redondo Beach; John R. Marum, Berkeley; James B. Cho, Gardena, all of Calif.

[73] Assignee: TRW Inc., Redondo Beach, Calif.

[21] Appl. No.: 336,499

[22] Filed: Apr. 11, 1989

[51] Int. Cl.⁵ .............................................. G06F 11/18
[52] U.S. Cl. ....................................... 371/36; 307/464
[58] Field of Search .................. 371/36, 7, 30, 68.1, 371/69.1; 364/200 MS File, 900 MS File; 307/464, 219; 377/116, 115

[56] References Cited

U.S. PATENT DOCUMENTS

| | | | |
|---|---|---|---|
| 2,910,584 | 10/1959 | Steele | 307/219 X |
| 3,522,455 | 8/1970 | Thomas | 307/219 X |
| 3,675,200 | 7/1972 | Bossen et al. | 340/146.1 |
| 4,281,398 | 7/1981 | McKenny et al. | 365/200 |
| 4,375,683 | 3/1983 | Wensley | 371/36 |
| 4,519,079 | 5/1985 | Hamer | 371/38 |
| 4,540,903 | 9/1985 | Cooke et al. | 307/465 |
| 4,617,475 | 10/1986 | Reinschmidt | 307/441 |
| 4,621,201 | 11/1986 | Amdahl et al. | 307/219 |
| 4,644,498 | 2/1987 | Bedard et al. | 364/900 |
| 4,670,880 | 6/1987 | Jitsukawa | 371/36 |
| 4,683,570 | 7/1987 | Bedard et al. | 371/36 |
| 4,748,594 | 5/1988 | Iida | 371/36 X |

FOREIGN PATENT DOCUMENTS 17600 1/1983 Japan ................................ 371/36

Primary Examiner—Jerry Smith
Assistant Examiner—Robert W. Beausoliel
Attorney, Agent, or Firm—James M. Steinberger; Ronald L. Taylor

[57] ABSTRACT

A fault tolerant register employing triple redundant storage of data and continuous voting to protect the data from Single Event Upset, or SEU. The fault tolerant register includes a single master multiplexer, three slave multiplexers connected in parallel to the output of the master multiplexer and three voting circuits positioned in feedback paths of the slave multiplexers. The slave multiplexers provide triple redundant storage for the data and the voting circuits correct any data that might become disrupted. The fault tolerant register of the present invention provides greatly improved SEU tolerance without a large increase in circuit area or without resorting to error correction and its attendant scrubbing process.

3 Claims, 1 Drawing Sheet

TRIPLE REDUNDANT FAULT-TOLERANT REGISTER

BACKGROUND OF THE INVENTION

This invention relates generally to fault tolerant devices and, more particularly, to triple redundant fault-tolerant integrated circuits.

Integrated circuits (IC's) used in computers and other electronic systems aboard space vehicles are susceptible to a phenomenon known as Single Event Upset, or SEU. Single Event Upset occurs when radiation passing through an integrated circuit deposits stray charges in the device, causing one of its registers to be disrupted.

Several fault protection techniques can be utilized to reduce the number of SEU's that occur in the integrated circuits used aboard space vehicles. One technique is to increase the size of the registers, as a larger register requires a greater amount of stray charge for an SEU to occur. However, the resistance to Single Event Upset only increases linearly with area. Therefore, a rather large tenfold increase in the area of a register only improves the resistance to upset by ten times.

Another technique for reducing Single Event Upset is to encode the contents of the registers with some type of error correction. However, conventional error correction techniques require a "scrubbing" process, in which the data is frequently read out from a register, corrected, re-encoded and restored in the register. This scrub cycle interrupts the normal use of the register and, if multiple errors occur between scrub cycles, the scrubbing process will not be successful in correcting the errors.

The disadvantages associated with these conventional fault protection techniques has made it apparent that a new technique for protecting IC registers from Single Event Upset is needed. The new technique should be self correcting and should not require a large increase in circuit area or require error correction and its attendant scrubbing process. The present invention is directed to these ends.

SUMMARY OF THE INVENTION

The present invention resides in a fault tolerant register employing triple redundant storage of data and continuous voting to protect the data from Single Event Upset, or SEU. The fault tolerant register includes a single master multiplexer, three slave multiplexers connected in parallel to the output of the master multiplexer and three voting circuits positioned in feedback paths of the slave multiplexers. The three slave multiplexers provide triple redundant storage for the data and the voting circuits correct any data that might become disrupted. The fault tolerant register of the present invention provides greatly improved SEU tolerance without a large increase in circuit area or without resorting to error correction and its attendant scrubbing process.

It will be appreciated from the foregoing that the present invention represents a significant advance in the field of fault tolerant devices. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
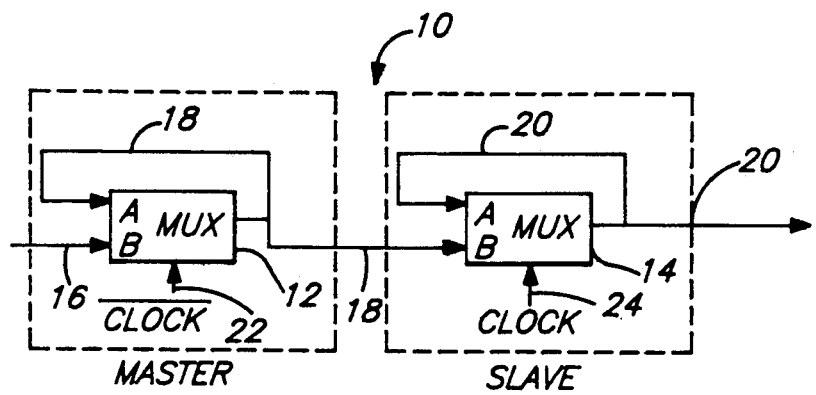
FIG. 1 is a block diagram of a conventional register used in integrated circuits.

As shown in the drawings for purposes of illustration, the fault tolerant register of the present invention utilizes triple redundant storage of data and continuous voting to protect the data from Single Event Upset. Integrated circuits used in computers and other electronic systems aboard space vehicles are susceptible to a phenomenon known as Single Event Upset, or SEU. Single Event Upset occurs when radiation passing through an integrated circuit deposits stray charges in the device, causing one of its registers to be disrupted. Several fault protection techniques can be utilized to reduce the number of SEU's that occur in the integrated circuits used aboard space vehicles, but these conventional techniques have several disadvantages.

FIG. 1 illustrates a conventional register 10 found in many integrated circuits. The register 10 includes, in series, a master multiplexer 12 and a slave multiplexer 14, both of which have two inputs, A and B, and a single output. The input of the register 10, on line 16, is applied to the B input of the master multiplexer 12, and the output of the multiplexer 12, on line 18, is applied to both the A input of the master multiplexer 12, to close a feedback path around the multiplexer 12, and to the B input of the slave multiplexer 14. The output of the slave multiplexer 14, on line 20, is the output of the register 10 and is also applied to the A input of the slave multiplexer 14, to close a feedback path around the multiplexer 14.

An out-of-phase clock signal, on line 22, drives the master multiplexer 12 and an in-phase clock signal, on line 24, drives the slave multiplexer 14. The out-of-phase clock signal is 180 degrees out of phase with the in-phase clock signal. When the out-of-phase clock signal is high, the master multiplexer 12 selects its B input and outputs this value on line 18 to the slave multiplexer 14. When the out-of-phase clock signal is low, the master multiplexer 12 selects its A input, providing a feedback of the output of the master multiplexer 12. Since the value that is fed back is the same value that was at the B input when the out-of-phase clock went low, this value is latched in and retained at the output of the master multiplexer 12, until the out-of-phase clock signal again goes high.

Figure 3:
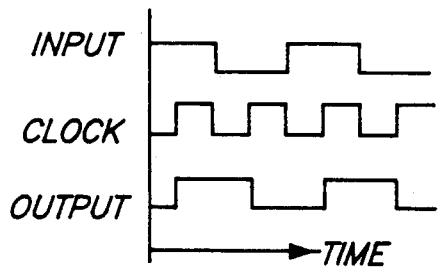
FIG. 3 is a timing diagram of a multiplexer used in the fault tolerant register of the present invention.

The slave multiplexer 14 operates in a similar fashion, but is 180 degrees out of phase with the master multiplexer 12. When the in-phase clock signal is high, the slave multiplexer 14 selects its B input and outputs this value from the register 10 on line 20. When the in-phase clock signal is low, the slave multiplexer 14 selects its A input, providing a feedback of the output of the slave multiplexer 14. Since the value that is fed back is the same value that was at the B input when the in-phase clock went low, this value is latched in and retained at the output of the slave multiplexer 14, until the in-phase clock signal again goes high. A timing diagram for the slave multiplexer 14 is shown in FIG. 3.

When the in-phase clock signal is low, the slave multiplexer 14 is holding data and is susceptible to Single Event Upset, or SEU. If an SEU caused an incorrect value to be fed back on line 20 to the A input of the slave multiplexer 14, this incorrect value would be retained until a new value was clocked into the register 10.

Figure 2:
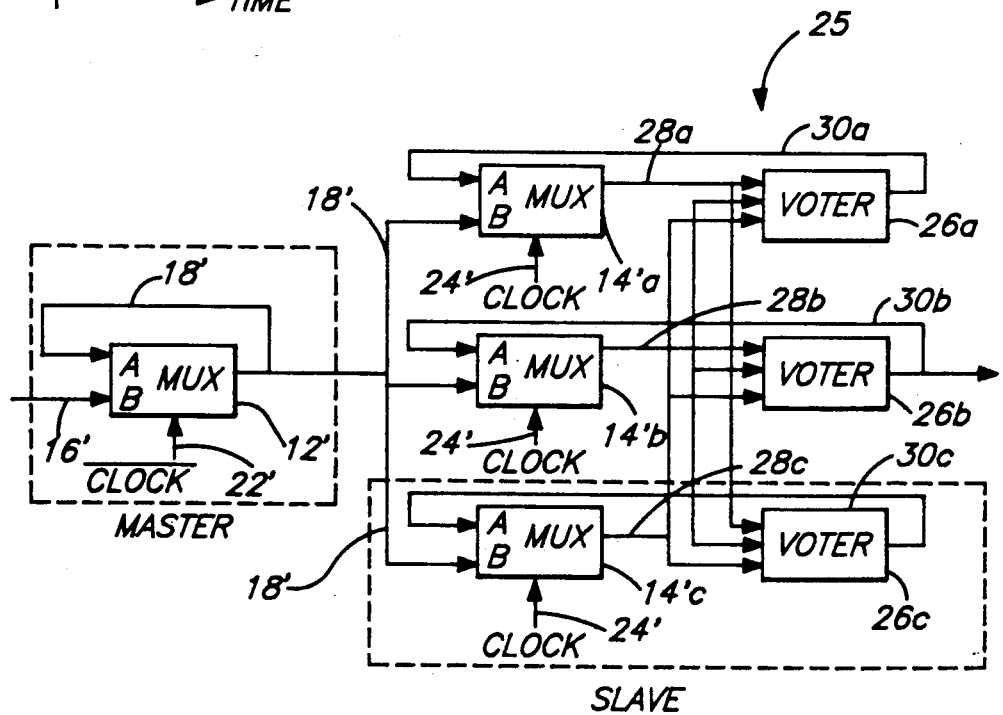
FIG. 2 is a block diagram of a fault tolerant register in accordance with the present invention.

As shown in FIG. 2, a fault tolerant register 25 in accordance with the present invention includes a single master multiplexer 12,, three slave multiplexers 14'a, 14'b and 14'c and three conventional voting circuits 26a, 26b, 26c positioned in the feedback paths of the slave multiplexers. As in the conventional register 10, the input of the fault tolerant register 25, on line 16', is applied to the B input of the master multiplexer 12', and the output of the multiplexer 12', on line 18', is applied to the A input of the master multiplexer 12', to close a feedback path around the multiplexer 12'. However, unlike the conventional register 10, the output of the master multiplexer 12' is applied to the B inputs of the three slave multiplexers 14'a, 14'b, 14'c. The outputs of the three slave multiplexers 14'a, 14'b, 14'c, on lines 28a, 28b, 28c, respectively, are applied to all three voting circuits 26a, 26b, 26c. The outputs of the three voting circuits 26a, 26b, 26c, on lines 30a, 30b, 30c, respectively, are applied to the A inputs of their respective slave multiplexers 14'a, 14'b, 14'c. The output of voting circuit 26b is the output of the fault tolerant register 25.

An out-of-phase clock signal, on line 22', drives the master multiplexer 12' and an in-phase clock signal, on line 24', drives the three slave multiplexers 14'a, 14'b, 14'c. The out-of-phase clock signal is 180 degrees out of phase with the in-phase clock signal. When the out-of-phase clock signal is high, the master multiplexer 12' selects its B input and outputs this value on line 18' to the slave multiplexers 14'a, 14'b, 14'c. When the out-of-phase clock signal is low, the master multiplexer 12' selects its A input, providing a feedback of the output of the multiplexer 12'. Since the value that is fed back is the same value that was at the B input when the out-of-phase clock went low, this value is latched in and retained at the output of the master multiplexer 12, until the out-of-phase clock signal again goes high.

The three slave multiplexers 14'a, 14'b, 14'c operate in a similar fashion, but are 180 degrees out of phase with the master multiplexer 12'. When the in-phase clock signal is high, the slave multiplexers 14'a, 14'b, 14'c select their B inputs and output this value on lines 28a, 28b, 28c, respectively. When the in-phase clock signal is low, the slave multiplexers 14'a, 14'b, 14'c select their A inputs, providing a feedback of the outputs of the voting circuits 26a, 26b, 26c. Since the values that are fed back are the same values that were at the B inputs when the in-phase clock went low, these values are latched in and retained at the outputs of the slave multiplexers 14'a, 14'b, 14'c, until the in-phase clock signal again goes high. The timing diagram for each of the slave multiplexers 14'a, 14'b, 14'c is the same as that of slave multiplexer 14 and is shown in FIG. 3.

When the in-phase clock signal is low, each of the slave multiplexers 14'a, 14'b, 14'c is holding data and is susceptible to an SEU. However, in the fault tolerant register of the present invention, data storage is shared among the three redundant storage elements with continuous voting between them, so there is no single storage element to be upset. In order to upset the fault tolerant register of the invention, at least two of the three storage elements must be upset simultaneously.

If one of the storage elements is upset by an SEU, the output of one of the slave multiplexers 14'a, 14'b, 14'c will be different from the other two. The voting circuits 26a, 26b, 26c will then correct the incorrect value by generating outputs that correspond to the majority of the inputs to the voting circuits. After a small propagation delay, without any further clocking of the multiplexers, the slave multiplexers will once again reflect the correct value. The propagation delay, known as correction time, is the time required for the slave multiplexers and the voting circuits to pass data. Usually, this is only a few gate delays. Accordingly, the fault tolerant register of the present invention provides greatly improved SEU tolerance without a large increase in circuit area or without resorting to error correction and its attendant scrubbing process.

From the foregoing, it will be appreciated that the present invention represents a significant advance in the field of fault tolerant devices. Although a preferred embodiment of the invention has been shown and described, it will be apparent that other adaptations and modifications can be made without departing from the spirit and scope of the invention. Accordingly, the invention is not to be limited, except as by the following claims.

We claim:

1. A fault tolerant register, comprising:
    a master multiplexer;
    three or more slave multiplexers connected in parallel to the output of the master multiplexer, each slave multiplexer having a feedback path; and
    a voting circuit positioned in the feedback path of each slave multiplexer, the outputs of the slave multiplexers being applied to all of the voting circuits;
    wherein the outputs of the voting circuits correspond to the outputs of a majority of the slave multiplexers, thereby correcting any incorrect data stored in one or more of the slave multiplexers.

2. The fault tolerant register as recited in claim 1, and further including:
    an out-of-phase clock signal for driving the master multiplexer; and
    an in-phase clock signal for driving the slave multiplexers;
    wherein the slave multiplexers store data when the in-phase clock signal is low.

3. The fault tolerant register as recited in claim 1, wherein the master multiplexer includes a feedback path.

* * * * *